(12) United States Patent
Fibiger et al.

(10) Patent No.: US 6,818,163 B1
(45) Date of Patent: Nov. 16, 2004

(54) NANOCOMPOSITE ARTICLES AND PROCESS FOR MAKING

(75) Inventors: Richard F. Fibiger, Midland, MI (US); Kyung W. Suh, Midland, MI (US); Mark A. Barger, Midland, MI (US); Joseph A. Schomaker, Mt. Pleasant, MI (US); Wenbin Liang, Sugar Land, TX (US); George A. Mackey, Newark, OH (US); Harvey C. Tung, Newark, OH (US)

(73) Assignee: Dow Global Technologies Inc., Midland, MI (US)

(*) Notice: Subject to any disclaimer, the term of this patent is extended or adjusted under 35 U.S.C. 154(b) by 0 days.

(21) Appl. No.: 09/890,907

(22) PCT Filed: Feb. 11, 2000

(86) PCT No.: PCT/US00/03682

§ 371 (c)(1),
(2), (4) Date: Nov. 16, 2001

(87) PCT Pub. No.: WO00/47657

PCT Pub. Date: Aug. 17, 2000

Related U.S. Application Data

(60) Provisional application No. 60/119,816, filed on Feb. 12, 1999.

(51) Int. Cl.[7] .................. B29C 44/02; B29C 44/20; B29C 47/02
(52) U.S. Cl. ........................... 264/51; 264/108
(58) Field of Search ................ 264/51, 108, 271.1

(56) References Cited

U.S. PATENT DOCUMENTS

| | | | |
|---|---|---|---|
| 4,558,074 A | | 12/1985 | Torbus |
| 5,122,291 A | | 6/1992 | Wolff et al. |
| 5,164,460 A | | 11/1992 | Yano et al. |
| 5,717,000 A | * | 2/1998 | Karande et al. ............ 521/83 |
| 5,717,006 A | | 2/1998 | Daculsi et al. |
| 5,760,106 A | * | 6/1998 | Pinnavaia et al. .......... 523/209 |
| 5,801,216 A | * | 9/1998 | Pinnavaia et al. .......... 523/209 |

FOREIGN PATENT DOCUMENTS

| | | |
|---|---|---|
| EP | 0 459 472 | 2/1995 |
| WO | 93/04117 | 3/1993 |

* cited by examiner

Primary Examiner—Allan R. Kuhns

(57) ABSTRACT

An improved process for making a structural foamed polymer, a multilayer polymer film, sheet or tube, a pultrusion polymer profile, a compression molded extruded fiber reinforced polymer pre-form, a strand foamed polymer and a SCORIM formed polymer article. The improvement includes the step of dispersing a multi-layered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material greater than the volume percent of the more then five layers of silicate material. In each of the above embodiments an important benefit of the instant invention is the orientation of the plane of the layers of silicate material. Preferably, most of the layers of silicate material have substantially the same orientation within thirty degrees of angle. Such orientation improves the properties of the product and provides a practical way to make larger products. The amount of multi-layered silicate material used is preferably between one and twenty percent.

4 Claims, No Drawings

NANOCOMPOSITE ARTICLES AND PROCESS FOR MAKING

This application is a 371 of PCT/US00/03682 Feb. 11, 2000 which claims the benefit of Provisional Appl. 60/119,816, filed Feb. 12, 1999.

This application is under a United States Government contract with The Department of Commerce (NIST)-Advanced Technology Program Project #70NANB7H3028.

BACKGROUND

This invention relates to polymer systems reinforced with delaminated or exfoliated multi-layered silicates, that is, nanocomposite polymer systems.

Nanocomposite polymers are compositions comprising a relatively high number (but relatively low weight) of exfoliated multi-layered silicate material dispersed in a given volume of continuous polymer matrix, U.S. Pat. No. 5,717,000 to Seema V. Karande, Chai-Jing Chou, Jitka H. Solc and Kyung W. Suh, herein fully incorporated by reference. As discussed in the '000 patent and as is well known in the art, nanocomposite polymers exhibit many increased physical property enhancements at a much lower volume percent of filler than conventionally filled polymers. For example, when nanocomposite polymers are formed into a film, the exfoliated multi-layered silicate material can be oriented in the direction parallel to the film surface, which contributes to the barrier properties of the film, U.S. Pat. No. 5,164,460, herein fully incorporated by reference.

SUMMARY OF THE INVENTION

The instant invention has twelve embodiments. The first embodiment is an improved process for making a structural foamed polymer comprising the steps of dispersing a gas-producing material into a fluid polymer at a first pressure followed by a second pressure less than the first pressure, the difference between the first pressure and the second pressure being sufficient to generate bubbles of gas in the fluid polymer. The improvement comprises the step of dispersing a multi-layered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The second embodiment of the instant invention is an improved structural foamed polymer comprising gas cells having polymer walls. The improvement comprises the polymer having dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The third embodiment of the instant invention is an improved process for making a multilayer polymer film or sheet comprising the step of coextruding layers of at least two different polymers or at least two different layers of the same polymer to form the multilayer polymer film or sheet. The improvement comprises the step of dispersing a multi-layered silicate material with at least one polymer so that the at least one polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The fourth embodiment of the instant invention is an improved multilayer polymer film, sheet or tube comprising layers of at least two different polymers or at least two layers of the same polymer. The improvement comprises at least one polymer having dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The fifth embodiment of the instant invention is an improved pultrusion process comprising the steps of impregnating a reinforcing fiber bundle with a polymer and forming a structural profile. The improvement comprises the step of dispersing a multilayered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The sixth embodiment of the instant invention is an improved pultrusion structural profile comprising a reinforcing fiber bundle impregnated with a polymer. The improvement comprises the polymer having dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The seventh embodiment of the instant invention is an improved compression molding process comprising the step of compression molding an extruded fiber reinforced polymer pre-form. The improvement comprises the step of dispersing a multi-layered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The eighth embodiment of the instant invention is an improved article, the article made by compression molding an extruded fiber reinforced polymer pre-form. The improvement comprises the polymer having dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The ninth embodiment of the instant invention is an improved process for making strand foamed polymer comprising the steps of extruding a polymer through a plurality of openings to form strands and then coalescing the strands. The improvement comprises the step of dispersing a multi-layered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The tenth embodiment of the instant invention is improved strand foamed polymer article. The improvement comprises the polymer having dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

The eleventh embodiment of the instant invention is an improved SCORIM process for molding a polymer into an article comprising the step of introducing the polymer into a mold by reciprocating flow. The improvement comprises the step of dispersing a multi-layered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate.

The twelfth embodiment of the instant invention is an improved SCORIM molded polymer article. The improvement comprises the polymer having dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material.

In each of the above embodiments an important benefit of the instant invention is the orientation of the plane of the layers of silicate material. More specifically, most of the layers of silicate material have substantially the same orientation (within thirty degrees of angle of the major surface of the fabricated material or of the interface of a multilayer structure) and this orientation improves the properties of the product. In the structural foamed polymer embodiment, the orientation is parallel to the cell wall with, for example, about seventy percent of the layers being within thirty degrees of parallel with the cell wall. In the multilayer polymer film, sheet or tube embodiment, the orientation is parallel to major surface of the film, sheet or tube. In the pultrusion embodiment, the orientation is parallel to fiber bundle. In the compression molding embodiment, the orientation is parallel to the reinforcing fibers. In the strand foamed polymer embodiment, the layers of silicate material are partially oriented by the initial extrusion process prior to foaming and further oriented parallel to the cell wall during foaming. In the SCORIM embodiment, the alignment is parallel to the plane of the part being molded. Another important benefit of the instant invention is that its articles can be relatively large (more than one kilogram) in comparison with articles made according to the prior art. The amount of multi-layered silicate material used in the instant invention is preferably between one and twenty weight percent.

DETAILED DESCRIPTION OF THE INVENTION

The term "multi-layered silicate material" is well known in the nanocomposite art and includes phyllosilicate clays and layered silicates. Illustrative of such materials are smectite clay minerals such as montmorillonite, nontronite, beidellite, hectorite, saponite, sauconite, and vermiculite clay minerals. This term also includes illite minerals such as ledikite and layered silicates such as magadiite and kenyaite. Preferred multi-layered silicate materials are phyllosilicates of the 2:1 type having a negative charge on the layers ranging from 0.25 to 1.5 charges per formula unit and a commensurate number of exchangeable cations in the interlayer spaces. Most preferred are smectite clay minerals such as montmorillonite, nontronite, beidellite, hectorite, saponite, sauconite, and the layered silicates magadiite, and kenyaite.

The technique used to disperse or "exfoliate" a multi-layered silicate material into a polymer is not critical in the instant invention as long as the volume percent of the one, two, three, four and five layers of silicate material so dispersed or "exfoliated" are greater than the volume percent of the more than five layers of silicate material so dispersed or "exfoliated". For example, such dispersion can be accomplished by polymerizing one or more monomers with a treated multi-layered silicate material as described in U.S. Pat. No. 5,973,053, herein fully incorporated by reference or, for example, by melt blending a treated multilayered silicate material with a polymer as described in U.S. Pat. No. 5,385,776, herein fully incorporated by reference. The volume percent of single, double, three, four five and more than five layers of silicate material is determined herein by electron microscopic examination of a representative sample wherein each layer by definition herein has the same volume.

The term "structural foamed polymer" and a basic teaching regarding its process and articles will be found in the Encyclopedia of Polymer Science and Engineering, Vol. 15, 1989, p. 771–797, herein fully incorporated by reference, and is patentably different than the foams discussed in U.S. Pat. No. 5,717,000. The minimum density of such foam product is often limited by the ability of the cell walls to withstand the loads which are applied during use. Conventional relatively large sized fillers like talc can be used to strengthen the cell walls. However, this can lead to premature rupture of the cell wall when the cell wall thickness approaches the size of the filler particles. This can limit how low a density of foam which can be prepared. In addition, an increase in the melt strength of the polymer is desirable for thinner cell walls and conventional fillers do not change the melt strength substantially. The orientation of the ideally single platelet shaped nanofillers of the instant invention (and the fact that, once oriented, they project a cross section of less than a few nanometers across the thickness of the cell walls) can overcome these difficulties and lead to lower density foam products with good load bearing capabilities. The high aspect ratio of the nanofillers of the instant invention also dramatically increases the polymer's melt strength and produces compositions in which the cell wall sees the maximum reinforcement both in the melt and solidified state. Thus a lower density foam can be produced which equals the performance of higher density products.

The term "multilayer polymer film, sheet or tube" is defined in and a basic teaching regarding its process and articles will be found in the Encyclopedia of Polymer Science and Engineering, Vol. 7, 1987, p106–127 herein fully incorporated by reference and in U.S. Pat. Nos. 3,576,707, 4,122,138, 5,443,874, 5,129,544, 5,441,781, 4,005,967, 3,739,052, 3,947,204 and 3,884,606, each of which are herein fully incorporated by reference. The multilayer coextrusion process has been used commercially to manufacture unique articles, tubes, sheets and films with 3 to 10 layers. It allows manufacture of products with layers thinner than can be made and handled as an individual ply. The layers may individually provide a specific attribute, such as barrier properties, mechanical strength, printability, or adhesion, to the overall structure. The multilayer extrusion process of the instant invention can, of course, be coupled with other processes such as solid phase forming, blow molding, stretch-blow molding, injection-blow molding and thermoforming to produce shaped articles.

The prior art multilayer coextrusion process suffers from difficulties in matching the rheology of separate layers. Mismatched rheology can lead to poor interfacial adhesion, a wavy interface and in extreme cases breakup of the interface. Thus, poor optical properties and reduced physical properties can be produced. It would also be advantageous to reduce the thickness of the individual layers in order to save on material costs. Reduction in thickness requires improved performance as well as very uniform layer structures. Conventional relatively large sized fillers such as talc can not generally be used in layers below 50 micrometers in thickness because such conventional fillers produce defects and flow instabilities. Extrusion molding processes often provide improved strength in the machine (extrusion) direction but are much weaker in the cross-direction. Mechanical processes such as molding with rotation have been developed to overcome this problem but they require specialized additional equipment. A simple method for maintaining strength biaxially is desired.

In this embodiment of the instant invention it is found that the ease of orientation of the plate-like nanofillers provides a method to optimize the properties in both thin layers and in relatively thick layers in a multilayer coextruded article. The plate-like nanofillers of the instant invention provide added melt strength to low viscosity layers which leads to more uniform layer thickness, are small enough so that they do not disrupt even the thinnest single layer and the formation process causes a high degree of orientation of the plates thus maximizing the performance of the article produced. The small size of the plates makes them transparent so that they can be used in applications where clarity is required. The biaxial nature of the platelet reinforcement provides additional strength in the cross-direction, which is inherently weak due to the fabrication process.

The composites of this embodiment of the instant invention are particularly applicable in multilayer automotive fuel tanks, automotive gas filler tube/neck, fuel transport lines and hollow multilayer moldings such as carbonated beverage bottles. In these situations, the nanofillers of the instant invention may be incorporated into those layers responsible for the desired property, for example, barrier to gases or vapors. The nanofiller of the instant invention provides improved performance and clarity; the orientation imparted to the nanoparticles in the extrusion process maximizes the performance. In the case of fuel tanks or other large articles, the multilayer sheet may be extruded, followed by thermoforming of separate halves and welding of the halves together to make a completed structure. In the case of other large articles a multilayered tube (or "parison") can be extruded followed by blow molding or the parison into a mold of the desired shape. Sagging of the parison during extrusion and prior to blow molding can cause difficulties in reproducibly controlling the process. The high aspect ratio of the nanofiller provides substantial reinforcement of the polymer melt and thus reduces the sagging problem of a large parison. Other applications of this embodiment of the instant invention include semi-rigid containers for food and industrial materials, signage, machine and furniture side panels and appliances. The number of layers can be five to ten or more than ten layers. In addition, the article made can be more than one kilogram in weight.

Coextrusion has been used commercially to manufacture unique films, sheets and tubes consisting of from as few as 3 layers to thousands of layers where the individual layers can be less than 100 nanometers thick. The plate-like fillers are highly oriented in these films by the extrusion process which assists in the flow stability during extrusion thus producing more intact layers. The thinner the layers, the greater the orientation and thus the greater the reinforcement. The orientation of the nanofiller also improves barrier and overall mechanical performance. Unlike conventional fillers, the thinness of the nanofillers of the instant invention allows for their presence without interfering with the optical properties of the films (or sheets or tubes).

Applications of this embodiment of the instant invention include barrier packaging for food and drugs, decorative films, nonmetallic mirrors for automotive and construction applications, transparent ultra violet or infra red reflective surfaces for windows and so forth.

The term "pultrusion" is defined in and a basic teaching regarding its process and articles will be found in the Encyclopedia of Polymer Science and Engineering, Vol. 4, 1986, p. 3–9 and 34–36 which are herein fully incorporated by reference. The practice of these processes can produce low modulus in a direction perpendicular to the fiber direction (off axis) and poor performance due to a loss in bonding between the reinforcing fibers and the matrix material. The loss in bonding, which is attributed to a mismatch in the coefficient of thermal expansion (CLTE) between the reinforcing fibers and the matrix resin, can be particularly poor with carbon fibers.

It is an object of this embodiment of the instant invention to improve the off axis strength of the composite via nanocomposites with the high aspect ratio platelets. This improved performance can be more pronounced as the thickness of the composite is reduced due to the alignment of the nanocomposite plates via the shear induced in the pultrusion process. The reduction in the CLTE of the matrix due to the presence of the nanofiller produces a better match of CLTE's between carbon fibers and the matrix resin leading to a more intact interface. This performance is surprising because it tends not to take place with conventional filler materials such as talc or calcium carbonate. This embodiment of the instant invention can be used with thermoplastic and thermoset resins but is most often practiced with thermoset resin like epoxies, vinyl esters, vinyl ethers and urethanes. Applications include, for example, intermodal containers, building walls and panels, structural profiles for bridges, automotive body panels, auto door panels/modules and auto bumper beams.

The term "compression molding" is defined in and a basic teaching regarding its process and articles will be found in the Encyclopedia of Polymer Science and Engineering, Vol. 4, 1986, p. 79–85, 104 and 108 which are herein fully incorporated by reference. A major problem with parts having support ribs which are made by compression molding an extruded fiber reinforced polymer pre-form can be "show through" of the support ribs when the wall thickness of the part is reduced below about 2 millimeters.

The use of a nanocomposite of the instant invention in the extruded fiber reinforced polymer pre-form reduces rib "show through" by reducing the coefficient of thermal expansion of the polymer to more closely match that of the glass fibers. The extrusion process can optimize orientation of the dispersed nanofiller of the instant invention by the use of multi-slit dies. Thus, the coefficient of linear expansion (CLTE) reduction is optimized by the extrusion process. The use of a nanocomposite of the instant invention can also produce a class A finish of the article superior to the use of conventional filler materials. This embodiment of the instant invention is especially useful to make automotive parts such as door panels, side panels, front end modules and structural instrument panels modules.

The term "strand foamed polymer" is defined in and a basic teaching regarding its process and articles will be found in U.S. Pat. Nos. 5,527,573, 4,801,484, 5,206,082 and 4,824,720, each of which are herein fully incorporated by reference. The density of strand foams can be further reduced over standard foams using nanocomposites because the nanofiller plates of the instant invention are optimally oriented by the initial fiber extrusion process prior to foaming. Unlike conventional fillers, the small size of the nanofiller of the instant invention makes this added thinning of the cell wall possible. The added orientation of the nanofiller of the instant embodiment also improves the polymer's melt rheology leading to improved foam stability. The resulting higher dimensional stability and impact strength makes the foams prepared according to this embodiment well suited for automobile bumpers, headliners, insulation panels and interior automobile pillars.

The term "SCORIM" (Shear Controlled Orientation in Injection Molding) is defined in and a basic teaching regarding its process and articles will be found in U.S. Pat. Nos. 4,994,220, 5,059,368, 4,925,161 and 5,160,466, each of which are herein fully incorporated by reference. The unique properties of the plate-like nanofiller of the instant invention produces a high degree of alignment across a large cross-section with minimal randomization of the particles, even during a prolonged cooling cycle. Thus larger parts are possible via SCORIM injection molding. In addition the nanofillers of the instant invention can be used for both reinforcement and rheology modification of one or more of the layers in an injection or a co-injection molded part. Applications of this embodiment of the instant invention include refrigerator liners, automotive facial containers and washing machine tubs.

In general, the SCORIM PROCESS comprises
(1) feeding a polymer feedstock into an elongate cavity of an injection molding machine, where the polymer is heated and melted by the cylindrical barrel heater of the injection molding machine;
(2) subjecting the molten polymer to a shear force by applying a periodic force to each of a plurality of regions of the molten polymer, there being a difference in the periodic forces applied to at least two different such regions effective to cause shear of the molten polymer at least between the two such regions;
(3) further heating, plasticizing and rendering substantially homogeneous the molten polymer by rotation of the injection screw of the injection molding machine;
(4) when determined to be of the right viscosity, injecting the molten polymer feedstock by rotation and downstream translation of the injection screw into a mold cavity; and
(5) forcing the molten polymer feedstock through a die plate comprising numerous small holes in a suitably desired spacial arrangement or alternatively an array of slits, desirably in an oscillating form such as a sine wave, honeycomb, square saw tooth or triangular saw tooth wave pattern.

The periodic forces applied to at least two different regions of the molten material can be out of phase, for example 180.degree, or in phase.

EXAMPLE 1

Coextruded films of nanocomposite polyolefin compounds are prepared using a coextrusion line that consists of two 19 millimeter single screw extruders equipped with gear pumps (1.2 cc/revolution pumping capacity). These extruders provide two independent meltstreams into a coextrusion feedblock that provides an initial two-layer meltstream (i.e., the first composite stream). This first composite stream is subsequently passed through a series of two channel layer multipliers (similar in design to those taught by Schrenk, et al. in U.S. Pat. No. 5,202,074, herein fully incorporated by reference) to create a second composite stream having an increased number of layers in accordance with the following equation:

$$N=2(2^n)$$

Where: N=Total number of layers
n=Number of layer multiplication stages

The second composite stream is subsequently passed though a 350 millimeter wide flex lip die and onto a chilled casting drum to fabricate a thin film.

The materials utilized are Engage EG8200 Brand Polyolefin Elastomer from Dupont-Dow Elastomers; PRIMACOR 3460 Brand Poly(ethylene-co-acrylic acid) from The Dow Chemical Company; PRIMACOR 1430 Brand Poly (ethylene-co-acrylic acid from The Dow Chemical Company; and Claytone HY Brand quaternary ammonium treated montmorillonite multilayered silicate material from Southern Clay Products.

The two PRIMACOR grades and Claytone HY are pre-compounded using a Werner Pfleiderer ZSK30 co-rotating twin screw extruder in the follow weight ratios:

| Material | wt % |
| --- | --- |
| PRIMACOR 1430 | 80 |
| PRIMACOR 3460 | 16 |
| Claytone HY | 4 |

This compound (Compound "A", approximately 0.8 volume % multi-layered silicate) is then coextruded with the Engage (equal volumetric ratios) using the previously described process under the following conditions:

Extruder A
  Material: Engage EG8200
  Extruder Barrel Set temperatures (C)
  Zone 1: 160
  Zone 2: 185
  Zone 3: 200

Gear Pump temperature: 200 C
Extruder Screw Speed: 70 RPM
Pump Speed: 35 RPM
Extruder B
  Material: Compound A
  Extruder Barrel Set temperatures (C)
  Zone 1: 155
  Zone 2: 175
  Zone 3: 190
Gear Pump temperature: 190 C
Extruder Screw Speed: 70 RPM
Pump Speed: 35 RPM
Layer Multipliers temperature: 192 C
Die temperature: 220 C The extruded films (nominal 2.5 mil thickness) were then tested for oxygen permeability and specular light transmission in accordance with ASTM test methods D3985 and D1003 respectively. The results are shown in the following table:

| Sample | Composition (volume %) | | Multiplication Stages | Total Number of Layers | $O_2$ Transmission Rate^ | Percent Haze |
|---|---|---|---|---|---|---|
| | EG8200 | Compound A | | | | |
| 1 | 50 | 50 | 2 | 8 | 500 | 7 |
| 2 | 50 | 50 | 4 | 32 | 500 | 7 |
| 3 | 50 | 50 | 4 | Blend* | 785 | 32 |

*Prepared by extruding a physical mixture of EG8200 and Compound A
Oxygen Transmission Rate Units: cc-mil/100 in²-day-atm.

EXAMPLE 2

Injection molded samples of polypropylene structural foams are prepared using an Arburg 170CMD brand reciprocating screw injection molding machine equipped with an 18 mm injection cylinder, a mechanical shut-off nozzle, and a plaque mold (cavity dimensions: 65 millimeter×65 millimeter×6 millimeter). The mold is fed through a full width, full thickness fan gate.

The specific material formulations in parts per hundred are described in the following table:

| ID | PP | 3150 | Claytone HY | FM1709H |
|---|---|---|---|---|
| I | 71.0 | 25.0 | — | 4.0 |
| II | 64.3 | 22.1 | 9.6 | 4.0 |

The materials are obtained from the following manufacturers:
  H702-35 homopolymer polypropylene (PP): The Dow Chemical Company
  Polybond 3150 grafted PP: Uniroyal Chemical
  Claytone HY quaternary ammonium treated montmorillonite: Southern Clay Products (55 wt % inorganic multi-layered silicate material)
  FM1709H Blowing Agent Equistar The blowing agent is azobisformamide based, and it is in the form of a concentrate in a polyolefin carrier. The PP/Polybond/Claytone HY materials employed in Formulation II were provided as a concentrate (67/23/10) prepared using a 25 mm high speed co-rotating twin screw extruder (a 30 HP Krupp Werner Pfleiderer ZSK Mega Compounder) operating under the following conditions:

Screw Speed: 1000 RPM
Extrusion Rate: 6.64 kg/hr
Torque: 35% of maximum
Barrel Set Temperatures: 150° C.
Die Set Temperature: 190° C.
Melt Discharge Temperature: 230° C.

The respective materials for each formulation were weighed, physically mixed, and then directly fed into the feed throat of the injection molding machine. The molding conditions that are generally employed are summarized below.

| Barrel Set Temp (° C.) | |
|---|---|
| Zone 1: | 182 |
| Zone 2: | 210 |
| Zone 3: | 221 |
| Nozzle: | 221 |
| Plasticization Speed (m/min): | 10 |
| Back Pressure (bar): | 30 (I) |
| | 60 (II) |
| Shot Size (cc): | 18 |
| Fill Time (s): | 0.5 |
| Pack Pressure (bar): | 25 |
| Pack Time (s): | 1 |
| Hold Time (s): | 130 |
| Mold Temperature (° C.): | 19 |

The foam samples exhibit a density of 26±1 lb/ft3, which represents density reduction of 54% relative to the solid polymer. These foams are subsequently tested for compressive properties by generally following ASTM procedure D1621-94. The results are summarized in the following table.

| ID | Compressive Modulus (ksi) | Yield Stress (psi) |
|---|---|---|
| I | 11.7 | 448 |
| II | 12.3 | 536 |

The nanofilled material exhibited a modulus and yield strength improvement of 5% and 20% relative to the unfilled control. The nanofilled material also exhibits improved post yield properties.

EXAMPLE 3

Injection molded samples of glass fiber reinforced polypropylene compounds are prepared using an Arburg 170CMD brand reciprocating screw injection molding machine equipped with an 18 mm injection cylinder and a modified ASTM Type I tensile bar mold. The specific material formulations in parts per hundred is described in the following table:

| | Homopolymer | Grafted | Claytone | Glass Fiber |
|---|---|---|---|---|
| ID | H702-35 | PB 3150 | Hy | R22Y-AA |
| D | 67 | 23 | 10 | |
| E | 60 | 21 | 9 | 10 |
| F | 47 | 16 | 7 | 30 |

The materials are obtained from the following manufacturers:
  H702-35 homopolymer polypropylene (PP): The Dow Chemical Company Polybond 3150: Uniroyal Chemical Claytone HY quaternary ammonium treated multi-layered silicate: Southern Clay Products (55 wt % inorganic multi-layered silicate)

R22Y-AA: Owens Corning Fiberglas

The PP/Polybond/Claytone HY materials employed in D–F are provided as a concentrate (67/23/10) prepared using a 25 mm high speed co-rotating twin screw extruder (a 30 HP Krupp Werner Pfleiderer ZSK Mega Compounder) operating under the following conditions:

Screw Speed: 1000 RPM
Extrusion Rate: 6.64 kg/hr
Torque: 35% of maximum
Barrel Set Temperatures: 150° C.
Die Set Temperature: 190° C.
Melt Discharge Temperature: 230° C.

The respective materials for each formulation are weighed, physically mixed, and then directly fed into the feed throat of the injection molding machine. The molding conditions that were generally employed are summarized below

| Barrel Set Temp (° C.) | |
| --- | --- |
| Zone 1: | 182 |
| Zone 2: | 204 |
| Zone 3: | 215 |
| Nozzle: | 215 |
| Plasticization Speed (m/min): | 5 |
| Back Pressure (bar): | 20 (200 for Samples C and F) |
| Shot Size (cc): | 16 |
| Fill Time (s): | 11 |
| Pack Pressure (bar): | 500 |
| Pack Time (s): | 60 |
| Mold Temperature (° C.): | 20 |

The samples are subsequently tested for flexural properties and coefficient of thermal expansion (CTE) parallel to the length axis by generally ASTM procedures D790 (Method 1 Procedure A) and E831 (−30 IC to 30° C.) respectively. The results are summarized in the following table.

| Sample ID | Flexural Modulus | Yield Strain | Yield Stress | CTE |
| --- | --- | --- | --- | --- |
| D | 296.8 | 2.83 | 5230 | 47 |
| E | 472.5 | 2.87 | 6910 | 37 |
| F | 815.3 | 1.69 | 8590 | 27 |

Flexural Modulus in ksi
Yield Strain in percent
Yield Stress in psi
CTE in micro m per m-degree C.

EXAMPLE 4

7.5 parts per hundred (pph) Closite 30 brand multi-layered silicate material from Southern Clay Products is blended into 5 gal of Derakane 411-350 (The Dow Chemical Company) at 7 degrees C. until homogeneous. 1.5 pph of a mold release agent (Axel PS 125) and 0.3 pph of air release agent (BYK 515) is added, followed by 0.19 of a mixed catalyst containing Peracodox 16N, Trigonox 141, and Trigonox C.

A fiber package consisting of 7 layers (1=Nexus Veil 110-039, 2=Glass Matting (M8643, 1.5 oz), 3=Glass roving 46 strands (PPG 2026, 113 yield), 4=Glass matting, 5=Glass Roving, 6=Glass Matting, 7=Nexus Veil) is impregnated with the resin via a dip bath and pulled through a 15×3 mm flat plate pultrusion die. The curing system consists of three eight inch heating zones (240° F., 280° F., and 280° F.). The final parts were 3.94 mm thick, consisted of 52 volume % resin, and 48 volume % glass with a density of 1.4–1.5 g/cm$^3$. Test specimens are cut from the final parts and tested with the following results: Tensile strength, 72312 psi; Modulus, 3410191 psi; Strain at break, 2.3%; Elongation at break, 2.28%.

What is claimed is:

1. A process for making an article, the article comprising a nanocomposite polymer, the article selected from the group consisting of a structural foamed polymer, a multi-layer polymer film, sheet or tube, a pultrusion structural profile, a compression molded polymer article formed from an extruded fiber reinforced polymer pre-form, a strand foamed polymer article and an article formed by the SCORIM process, comprising the steps of: dispersing a multi-layered silicate material with the polymer so that the polymer has dispersed therein single layers of silicate material, double layers of silicate material, triple layers of silicate material, four layers of silicate material, five layers of silicate material and more than five layers of silicate material, the volume percent of the one, two, three, four and five layers of silicate material being greater than the volume percent of the more than five layers of silicate material to form a nanocomposite polymer; the process characterized by the step of forming the nanocomposite article by flowing the nanocomposite polymer by extrusion, coextrusion, pultrusion or the SCORIM process to align the planes of the one, two, three, four and five layers of silicate material so that more than one half of the planes have the same orientation within thirty degrees as determined by electron microscopy.

2. The process of claim 1, wherein the article is a multilayer polymer film, sheet or tube and wherein the number of layers is ten or more.

3. The process of claim 1 or 2, wherein the weight percent of the multi-layered silicate material dispersed in the polymer is in the range of from one to twenty percent.

4. The process of claim 1 or 2, wherein the weight percent of the multi-layered silicate material dispersed in the polymer is in the range of from two to ten percent.

* * * * *